(12) United States Patent
Nikola

(10) Patent No.: US 10,297,992 B2
(45) Date of Patent: May 21, 2019

(54) HOLDING DEVICE AND ELECTRICAL APPARATUS

(71) Applicant: SEW-EURODRIVE GMBH & CO. KG, Bruchsal (DE)

(72) Inventor: Joachim Nikola, Kraichtal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 15/750,155

(22) PCT Filed: Jul. 13, 2016

(86) PCT No.: PCT/EP2016/025076
§ 371 (c)(1),
(2) Date: Feb. 2, 2018

(87) PCT Pub. No.: WO2017/021009
PCT Pub. Date: Feb. 9, 2017

(65) Prior Publication Data
US 2018/0226778 A1    Aug. 9, 2018

(30) Foreign Application Priority Data

Aug. 4, 2015 (DE) .................. 10 2015 010 045
Apr. 21, 2016 (DE) .................. 10 2016 004 976

(51) Int. Cl.
*H02G 3/04* (2006.01)
*H01R 13/58* (2006.01)
(Continued)

(52) U.S. Cl.
CPC ........... *H02G 3/04* (2013.01); *H01R 13/5808* (2013.01); *H01R 13/648* (2013.01);
(Continued)

(58) Field of Classification Search
CPC .. H02G 3/04; H02G 3/30; H02G 3/08; H02G 15/007; H02G 3/0406; H02G 3/081;
(Continued)

(56) References Cited

U.S. PATENT DOCUMENTS

| | | | |
|---|---|---|---|
| 5,637,016 A | 6/1997 | Frech | |
| 8,513,521 B2 * | 8/2013 | Zhang | ................ G06F 1/183 |
| | | | 174/100 |

(Continued)

FOREIGN PATENT DOCUMENTS

| | | |
|---|---|---|
| DE | 89 00 574 U1 | 3/1989 |
| DE | 296 10 613 U1 | 9/1996 |

(Continued)

OTHER PUBLICATIONS

International Serach Report dated Oct. 14, 2016, in International Application No. PCT/EP2016/025076. (English-language translation).

(Continued)

*Primary Examiner* — Angel R Estrada
(74) *Attorney, Agent, or Firm* — Hunton Andrews Kurth LLP

(57) ABSTRACT

In a holding device for a cable that includes a sheet-metal part, and an electrical apparatus, the sheet-metal part has a first sheet-metal section and a second sheet-metal section, which are connected by a bending section. The first sheet-metal section is bendable relative to the second sheet-metal part, in particular manually bendable, in particular in the bending section, and in particular such that the first sheet-metal section and the second sheet-metal section are disposed at a non-vanishing bending angle with respect to each other. The first sheet-metal section is connected in an electrically conductive manner to a cable shield of the cable. The cable is connected to the first sheet-metal section by (Continued)

friction locking, the cable in particular being held and guided, in particular locally guided, with the aid of the holding device, and the second sheet-metal section has an interface for the mechanical connection.

14 Claims, 7 Drawing Sheets

(51) Int. Cl.
  *H01R 13/6592* (2011.01)
  *H01R 13/648* (2006.01)
  *H02G 3/08* (2006.01)
  *H02G 3/30* (2006.01)
  *H02G 15/007* (2006.01)
  *H01R 9/03* (2006.01)

(52) U.S. Cl.
  CPC ........... *H01R 13/6592* (2013.01); *H02G 3/08* (2013.01); *H01R 9/032* (2013.01); *H02G 3/30* (2013.01); *H02G 15/007* (2013.01)

(58) Field of Classification Search
  CPC .............. H01R 13/5808; H01R 13/648; H01R 13/6592; H01R 9/032
  USPC ........ 174/51, 68.1, 68.3, 88 R, 72 R, 50, 59, 174/520; 248/68.1, 49
  See application file for complete search history.

(56) References Cited

U.S. PATENT DOCUMENTS

| | | | |
|---|---|---|---|
| 8,735,727 B2 * | 5/2014 | Chen | G06F 1/181 174/135 |
| 8,746,633 B1 * | 6/2014 | Medlin, Jr. | H02G 3/32 174/481 |
| 2003/0111248 A1 | 6/2003 | Buchberger | |

FOREIGN PATENT DOCUMENTS

| | | |
|---|---|---|
| DE | 297 15 884 U1 | 10/1997 |
| DE | 197 43 353 A1 | 9/1998 |
| DE | 101 55 434 C1 | 6/2003 |
| DE | 102 32 657 B3 | 3/2004 |
| DE | 10 2008 034 113 A1 | 2/2010 |
| DE | 20 2009 016 954 U1 | 3/2010 |
| DE | 20 2010 009 722 U1 | 10/2010 |
| DE | 20 2013 104 941 U1 | 11/2013 |
| EP | 0 709 929 B1 | 11/1998 |
| JP | 2007-131086 A | 5/2007 |
| WO | 2015/003831 A1 | 1/2015 |

OTHER PUBLICATIONS

International Preliminary Report on Patentability issued in international patent application No. PCT/EP2016/025076, dated Feb. 6, 2018 (8 pages total).

* cited by examiner

HOLDING DEVICE AND ELECTRICAL APPARATUS

FIELD OF THE INVENTION

The present invention relates to a holding device and to an electrical apparatus.

BACKGROUND INFORMATION

Connection devices for lines of an industrial control are described in German Published Patent Document No. 296 10 613.

German Published Patent Document No. 102 32 657 describes a shield connection device.

German Published Patent Document No. 20 2010 009 722 describes a cable and power device.

German Published Patent Document No. 20 2009 016 954 describes a connection system and an associated set.

An electrical connection device is illustrated in German Published Patent Document No. 10 2008 034 113.

German Published Patent Document No. 101 55 434 discloses a cable bushing through a shielding wall.

Japanese Published Patent Document No. 2007-131086 describes a ground connection for a vehicle and a grounding method for a vehicle.

European Published Patent Document No. 0 709 929 illustrates a high-frequency plug-connector system.

A connection element for a shield cable is described in German Published Patent Document No. 297 15 884.

German Published Patent Document No. 197 43 353 discloses a system for the electrical contacting of cable shields.

PCT Published Patent Document No. WO 2015/003831 illustrates a bus-connection device.

Connection devices for lines of an industrial control are described in German Published Patent Document No. 296 10 613.

SUMMARY

Example embodiments of the present invention provide a holding device and an electrical apparatus with the goal of improving safety.

According to an example embodiment of the present invention, a holding device for a cable includes having a sheet-metal part, and the sheet-metal part has a first sheet-metal section and a second sheet-metal section, which are connected to each other through a bending section. The first sheet-metal section is bendable, in particular manually bendable, relative to the second sheet-metal section, in particular in the bending section, and in particular such that the first sheet-metal section and the second sheet-metal section are disposed at a non-vanishing bending angle with respect to each other. The first sheet-metal section is connected in an electrically conductive manner to a cable shield of the cable, and the cable is connected to the first sheet-metal section by a force-locking connection, the cable in particular being held and guided, in particular locally guided, with the aid of the holding device (3, 103). The second sheet-metal section has an interface for the mechanical connection.

This has the advantage that the first sheet-metal section is easily able to be aligned relative to the second sheet-metal section. Up to a certain degree, which is defined by a maximum bending angle, the alignment of the first sheet-metal section is independent of the alignment of the second sheet-metal section, which is defined by the interface for the mechanical connection such as to an electrical apparatus. As a result, it is possible to adapt the contact surface for the cable on the first sheet-metal section to the cable.

The holding device holds and guides the cable. A cable fracture is able to be avoided inasmuch as the contact area for the cable is able to be aligned with the extension direction of the cable, so that a maximally permitted bending radius for the cable will not be exceeded.

The bending of the sheet-metal part is able to be carried out manually. This makes it possible to adapt the holding device to the extension direction of the cable without the use of tools, e.g., directly in the application of the holding device. A retroactive adaptation after the holding device has been installed is also possible.

The electrically conductive connection between the conductor and the sheet-metal part is implemented across a large surface and thereby creates a particularly secure connection.

The bending section may be arranged in the form of a line. This has the advantage of allowing for an adjustment of a uniform bending angle between the first and the second sheet-metal sections, which improves the stability of the holding device.

The sheet-metal part may include a recess through which the cable may be routed or, in particular, through which the cable is at least partially routed, the bending section in particular having two web sections, which are set apart from each other with the aid of the recess. This is considered advantageous inasmuch as the cable is able to be guided on two sides of the sheet-metal part that are situated opposite from each other. The cable is able to be connected to an electrical apparatus regardless of the alignment of the holding device. The holding device may have a compact configuration.

The cable, in particular a conductor, and in particular an inner conductor, of the cable may be connected to a plug-connector part. This is considered advantageous as it allows for an uncomplicated connection of the cable or the conductors to an electrical apparatus with the aid of a mating plug-connector part.

The plug-connector part may be routed through the recess. This offers the advantage that the cable, which is connected to the plug-connector part, is able to be preassembled. A preassembled cable including a plug-connector part lends itself well both to an application in which the plug-connector part is routed through the recess and to an application in which the cable is routed along the sheet-metal part and, in particular, is not routed through the recess.

The cable shield may terminate at the first sheet-metal section. This is considered advantageous since the end region of the cable shield is able to be clamped between the sheet-metal part and a cable clip. A separation that starts at the end region of the cable shield, which is arranged in braided form, for example, is preventable.

The bending section may be formed by at least two web sections that are set apart from each other by a recess that is situated between the web sections. This has the advantage that the bending of the sheet-metal part is easily accomplished without the use of a tool.

The web sections may have a concave shape and the recess may have a convex shape, the web sections in particular being disposed in the form of a line. This is considered advantageous inasmuch as the sheet-metal part is automatically bendable along a line. The mechanical tensions in the sheet-metal part may be concentrated in the bending section, which improves the stability of the holding device.

The bending section may have a lower sheet thickness than all of the other sheet-metal sections. This is considered advantageous because the sheet-metal part is easily bendable without tools via the bending section.

The holding device may have a cable clip, and the cable may be connected to the holding device by force locking with the aid of the cable clip. This has the advantage that the cable, in particular the cable shield, is in contact with the cable clip and the sheet-metal part across a large surface, so that a safe, electrically conductive connection is provided between the cable, especially the cable shield, and the holding device.

The cable maybe situated between the sheet-metal part and the cable clip, the cable being free of tension on account of the sheet-metal part and the cable clip. This has the advantage of preventing a cable fracture, and therefore improves safety.

The cable shield of the cable may be connected to the cable clip in an electrically conductive manner. This has the advantage that the contact area of the cable, in particular of the cable shield, on the holding device is able to be enlarged with the aid of the cable clip. A safe, electrically conductive connection is provided as a result.

The cable may have a cable insulation which is stripped between the cable clip and the sheet-metal part. This has the advantage that local stripping improves the stability of the cable and simultaneously allows for the creation of a safe, electrically conductive connection.

The cable clip may have a cable-clip section and a recess for a screw device; the sheet-metal part may have a recess for the feed-through of the cable-clip section and a bore hole for the screw device. The cable clip is guided inside the recess with the aid of the cable-clip section, the cable clip being detachably connected to the sheet-metal part with the aid of the screw device. This is considered advantageous inasmuch as the cable clip is connected to the sheet-metal part in a detachable manner. The cable may be situated between the cable clip and the sheet-metal part in a manner that allows the cable to move in the extension direction of the cable. With the aid of the cable-clip section and/or the screw device, the cable is able to be restricted at least in a direction transverse to the extension direction.

A second cable may be connected to the holding device with the aid of the cable clip. This is considered advantageous inasmuch as two cables are connectable to the holding device using a single cable clip. This saves components and benefits the environment.

The cables may be bundled with the aid of the holding device. This has the advantage that the holding device jointly guides the cables. The bundling may remain unchanged when the holding device is switched from one electrical apparatus to another electrical apparatus. This reduces the risk of accidentally switching cables, and thus improves safety.

The cable and the second cable may have an identical cable cross-section. This has the advantage that the two cables can be evenly pressed against the sheet-metal part by the single cable clip, so that the same pressure force is acting on both cables. It is considered advantageous in this context that both cables are securely connected to the holding device. The pressure force is evenly adjustable with the aid of the screw device so that a maximum pressure force is maintained for both cables.

The sheet-metal part may have a third sheet-metal section that extends parallel to the first sheet-metal section, and an additional cable may be connected to the third sheet-metal section with the aid of an additional cable clip; a conductor of the further cable, in particular the cable shield, may be connected in an electrically conductive manner to the further cable clip and to the third sheet-metal section. This is considered advantageous inasmuch as it allows for a compact configuration of the holding device.

The further cable may have a smaller or larger cable cross-section than the cable. This offers the advantage that cables having different cable cross-sections are able to be bundled using the holding device.

The sheet-metal part may have a fourth sheet-metal section and a fifth sheet-metal section, the fourth sheet-metal section being situated at a non-vanishing angle with respect to the second sheet-metal section, in particular at a right angle. The fifth sheet-metal section is situated at a non-vanishing angle to the first sheet-metal section, in particular at a right angle, and the bending section is situated between the fourth sheet-metal section and the fifth sheet-metal section. The bending angle between the first sheet-metal section and the second sheet-metal section is restricted by the fourth sheet-metal section and the fifth sheet-metal section, the fourth sheet-metal section in particular touching the fifth sheet-metal section at a maximum bending angle. This has the advantage that the bending angle of the sheet-metal part is able to be restricted with the aid of the fourth and fifth sheet-metal sections. Excessive bending of the sheet-metal part and a resulting brittle fracture are therefore prevented, which improves safety.

The first sheet-metal section and the second sheet-metal section may be connected to each other in an electrically conductive manner with the aid of a connection cable. This is considered advantageous inasmuch as it creates a redundant electrically conductive connection. Should the sheet-metal part break, safe grounding would therefore still be possible, which improves safety.

The sheet-metal part may be arranged as one part, in particular as a punched and bent part. This offers the advantage of allowing for a cost-effective and uncomplicated production of the sheet-metal part.

According to an example embodiment of the present invention, an electrical apparatus includes a holding device for a cable, and includes at least one housing part. The holding device is detachably connected to the housing part, and the housing part is connected in an electrically conductive manner to a cable shield of the cable with the aid of the holding device. The housing part is connected to ground, in particular.

This has the advantage that the cable is able to be connected to the electrical apparatus in a detachable manner with the aid of the holding device. A safer electrically conductive connection of the cable shield to the electrical apparatus is created in the process. Multiple cables are able to be bundled with the aid of the holding device and are simultaneously detachable from the electrical apparatus. This allows for an uncomplicated exchange of the electrical apparatus while reducing the risk of a mix-up in the cables.

The second sheet-metal section may include two guide sections for connecting the holding device to the housing part, in particular as an interface for the mechanical connection. This is considered advantageous inasmuch as it allows for a safe and uncomplicated connection of the holding device to the electrical apparatus.

The holding device may be plug-connected to the housing part with the aid of the guide sections. This has the advantage that the holding device is able to be connected to the electrical apparatus in a detachable manner.

The holding device may be detachably connected to the housing part with the aid of a screw device. This is considered advantageous inasmuch as the electrical apparatus connected to the cables is easily exchangeable. The release of all ground connections simply requires a release of the screw device whereas the cable shields remain connected to the holding device in an electrically conductive manner.

The cable may be detachably connected to the electrical apparatus with the aid of a plug-connector part. The electrical apparatus includes a mating plug-connector part, and a conductor, especially an inner conductor, of the cable is connected to the mating plug-connector part in an electrically conductive manner with the aid of the plug-connector part. This is considered advantageous since it allows for an uncomplicated exchange of the electrical apparatus, the exchange merely requiring a release of the screw device for the connection of the holding device, while all other connections remain plugged in.

Further features and aspects of example embodiments of the present invention are described in greater detail below with reference to the Figures.

DETAILED DESCRIPTION

Figure 1:
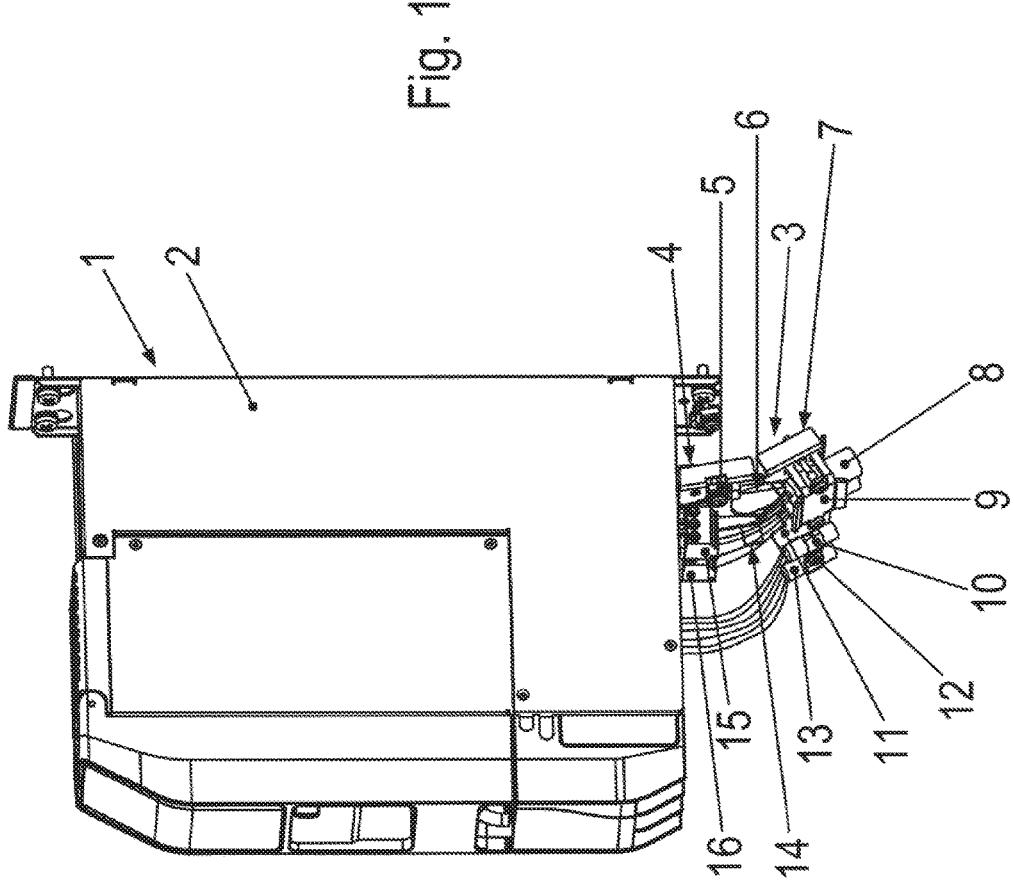
FIG. 1 shows an oblique view of the electrical apparatus that includes the holding device according to an example embodiment of the present invention.
Figure 2:
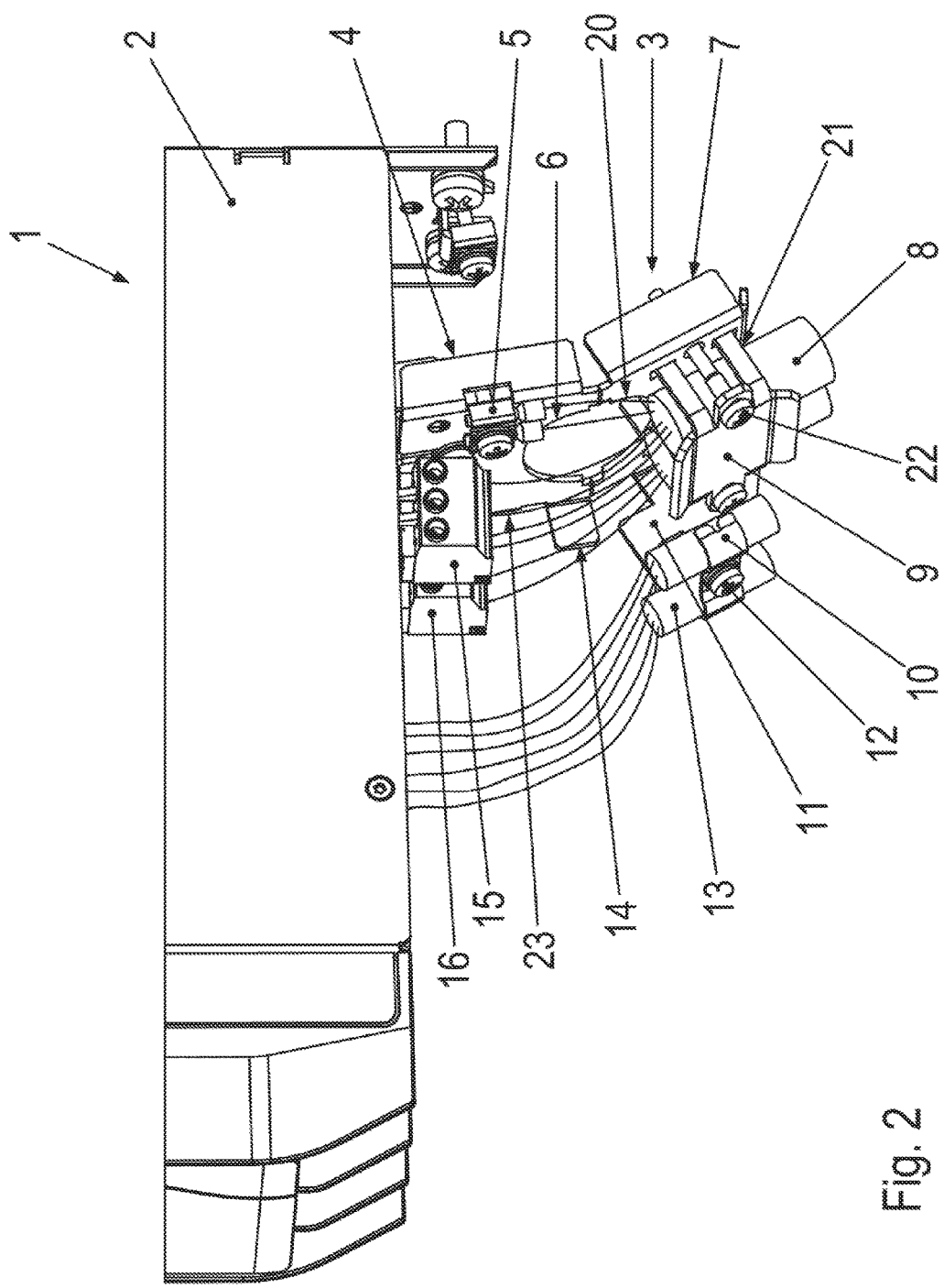
FIG. 2 shows a detail view of the electrical apparatus illustrated in FIG. 1.

Electrical apparatus 1 according to an example embodiment of the present invention, in particular a rectifier for the supply of an electrical motor, as shown in FIGS. 1 and 2, has a housing that encompasses at least one housing part 2, which is arranged to be electrically conductive and, in particular, is made from a metallic material, e.g., aluminum. Housing part 2 has a ground terminal, and housing part 2 is, e.g., connected to ground.

Electrical apparatus 1 includes a mating plug-connector part for the connection to a plug-connector part (15, 16), which is connected to a cable 8, in particular to a motor-connection cable.

Cable 8 is provided with a cable shield. The cable shield radially surrounds the conductor(s), in particular the inner conductor(s), of cable 8. The cable shield is formed from an electrically conductive material, in particular from a metallic material, e.g., copper or aluminum. With the aid of the cable shield, the conductors in the interior of the cable are able to be shielded from electromagnetic interference fields.

The conductors are connected to the plug-connector part (15, 16) so that an electrically conductive connection of the conductors to an electronics system of electrical apparatus 1 is able to be established with the aid of the plug-connector part (15, 16) and the mating plug-connector part.

The conductors of cable 8 are provided with an insulation in each case. Cable 8 has a separation point at which the cable shield ends and from where the conductors are able to be routed individually. Cable 8, for example, has an additional insulation that surrounds the cable shield in the radial direction.

Electrical apparatus 1 is connected to a holding device 3.

Holding device 3 has a sheet-metal part 32, which includes a first sheet-metal section 20, a second sheet-metal section 23, a third sheet-metal section 31, a fourth sheet-metal section 4, a fifth sheet-metal section 7, a sixth sheet-metal section 11, a seventh sheet-metal section 14, and a bending section 30, a first cable clip 9, a second cable clip 10, a screw device (12, 22), and a connection device 5.

Sheet-metal part 20 is provided in one piece, e.g., as a punched and bent part.

Figure 3:
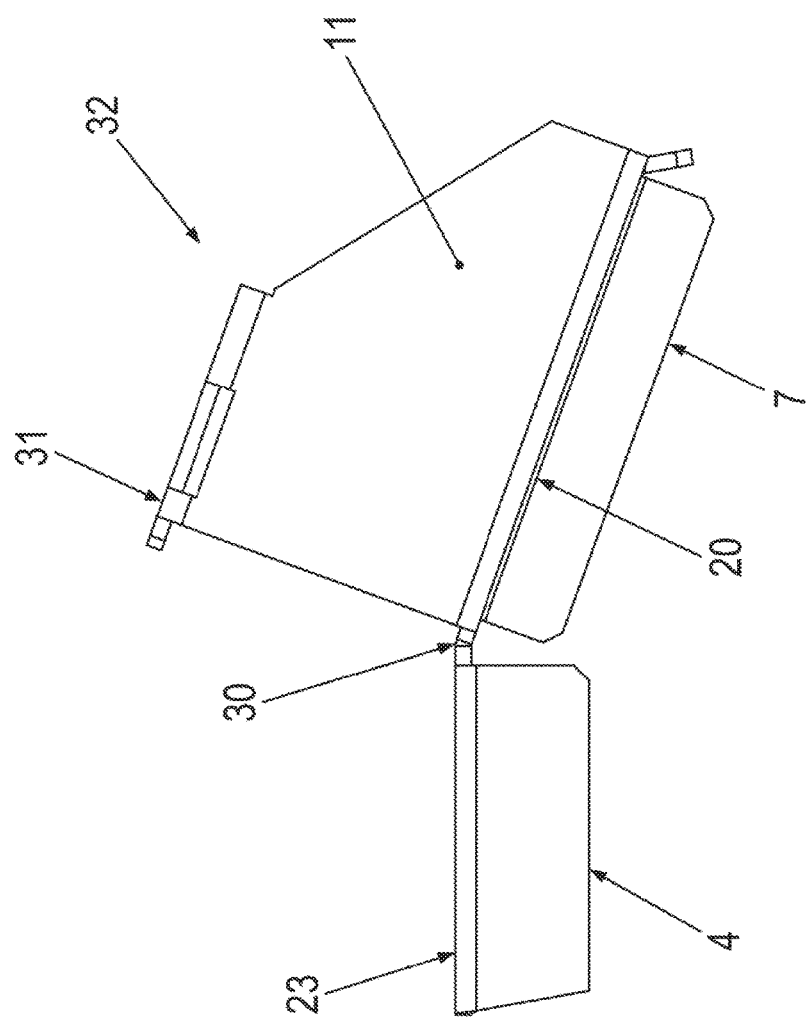
FIG. 3 shows a side view of a sheet-metal part of the holding device.
Figure 4:
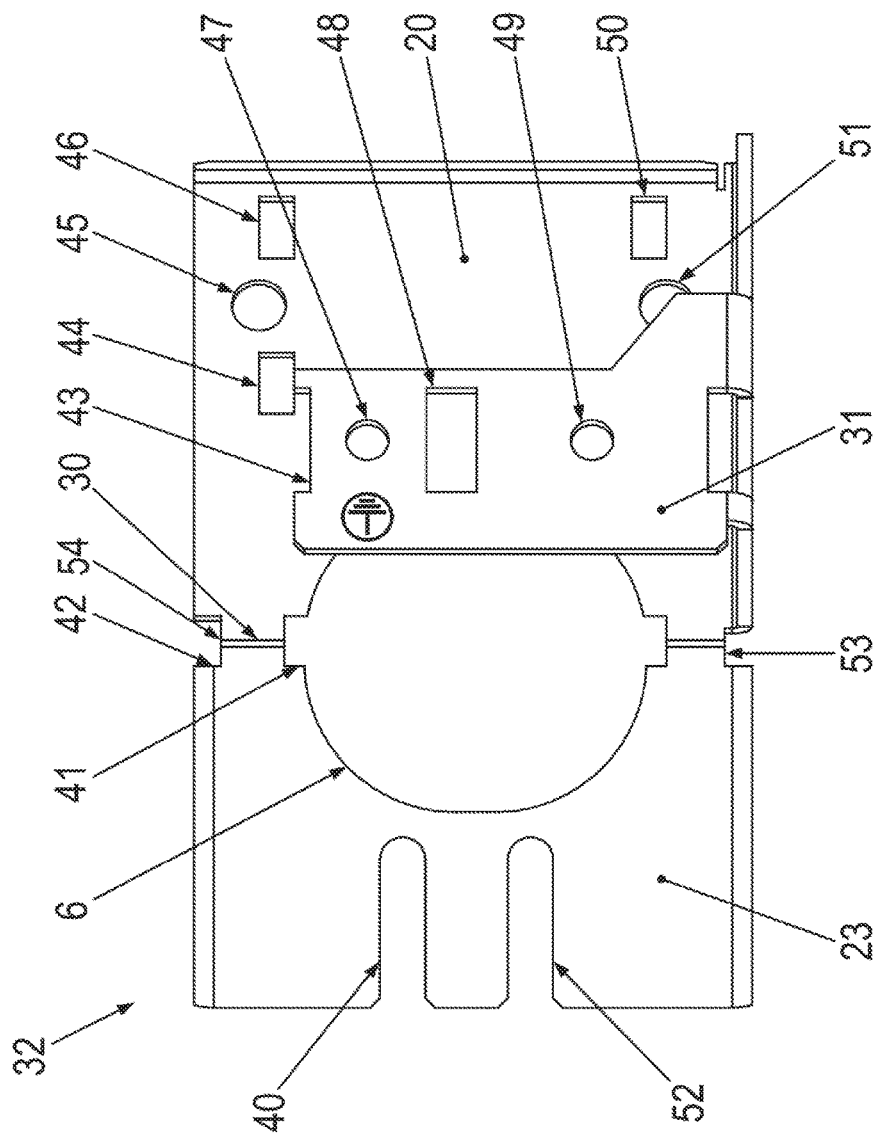
FIG. 4 shows a plan view of the sheet-metal part.
Figure 5:
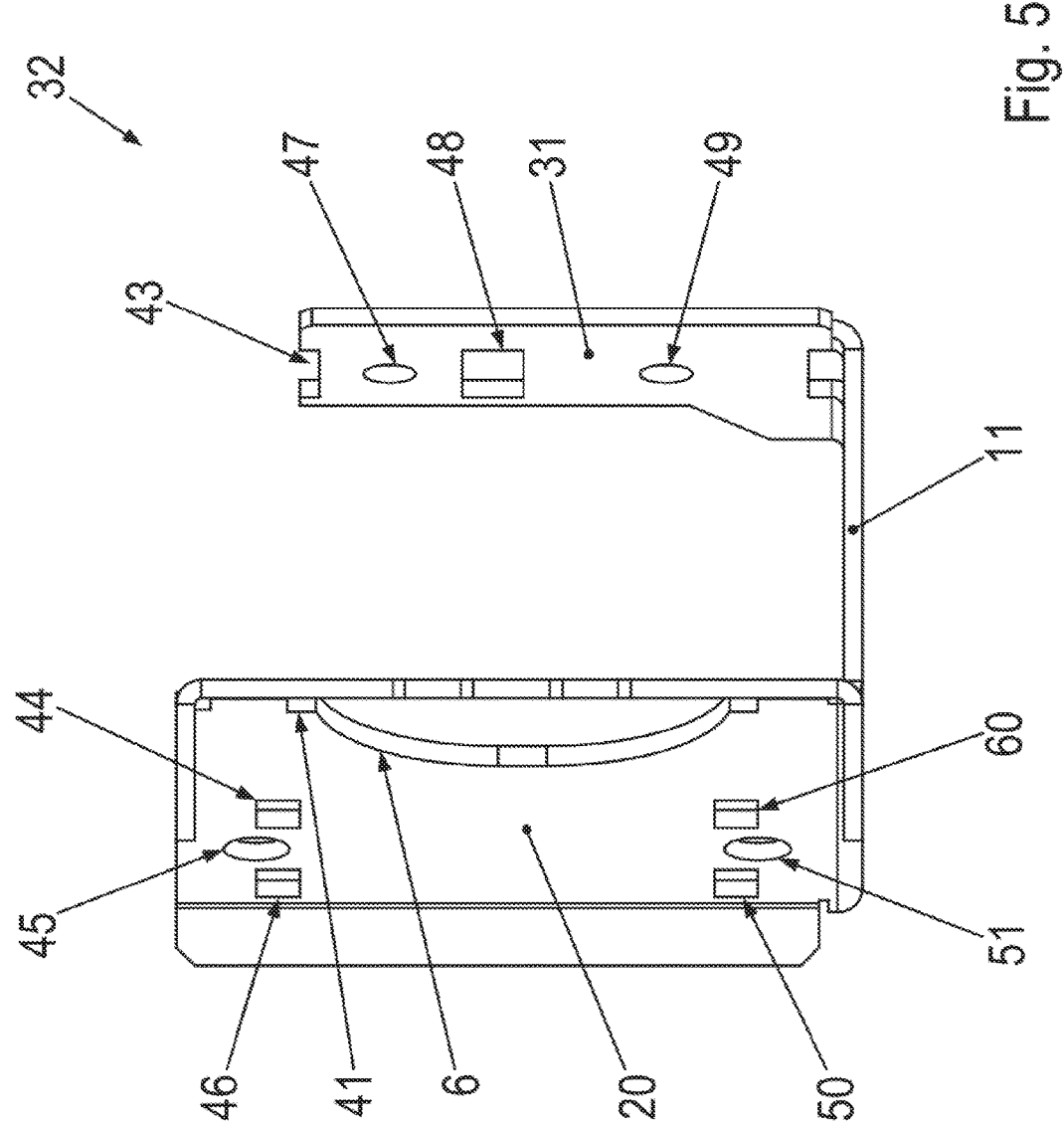
FIG. 5 shows an oblique view of the sheet-metal part.

Bending section 30 is situated between first sheet-metal section 20 and second sheet-metal section 23. Bending section 30 is suitably arranged for manual bending of first sheet-metal section 20 relative to second sheet-metal section 23. For this purpose, sheet-metal part 32, which is shown in detail in FIGS. 3 through 5, includes a recess 6, which is situated between two web sections (53, 54). The maximum extension of recess 6 is greater than the web width of the web sections (53, 54), e.g., more than twice as great and in particular more than three times as great, especially more than four times as great, and, for example, more than five times as great. In addition, sheet-metal part 32 has a separate tapered region (41, 42) on two sides of each web section (53, 54) that are situated opposite from each other.

Manual bending means bending without the use of tools, especially bending using bare hands.

Recess 6 may have a size that is large enough for the feed-through of plug-connector part 15 through recess 6. For example, cable 8 is partially guided through the recess when the electrical apparatus is in operation, so that a sub-region of cable 8 is surrounded by sheet-metal part 32.

On account of the bending, the first and second sheet-metal sections (20, 23) are disposed at a non-vanishing bending angle relative to each other.

The first and second sheet-metal sections (20, 23) are connected to each other in an electrically conductive manner with the aid of a connection cable. For this purpose, the connection cable is connected to the cable shield of cable 8 in an electrically conductive manner and detachably connected to second sheet-metal section 23 with the aid of a connection device 5. Connection device 5 includes a screw device that connects the connection cable to second sheet-metal section 23 in a detachable manner.

Fourth sheet-metal section 4 extends at a non-vanishing angle, in particular at a right angle, to second sheet-metal section 23. Fifth sheet-metal section 7 extends at a non-vanishing angle, in particular at a right angle, to first sheet-metal section 20. The fourth and fifth sheet-metal sections (4, 7) are situated at a distance from bending section 30. The bending angle between the first and second sheet-metal sections (20, 23) is restricted by the fourth and fifth sheet-metal sections (4, 7). For this purpose, the fourth and fifth sheet-metal sections (4, 7) extend substantially parallel to the first or second sheet-metal section (20, 23). Once a maximum bending angle has been reached in a first bending direction, the fourth and fifth sheet-metal sections (4, 7) make contact with each other so that further bending in the first bending direction is prevented. The bending angle in the first bending direction is less than 90°, especially less than 45°, and, e.g., less than 20°.

Third sheet-metal section 31 is set apart from first sheet-metal section 20 and is situated substantially parallel to first sheet-metal section 20. Third sheet-metal section 31 defines a plane, and first sheet-metal section 20 defines a further plane, the normal vectors of these planes being disposed substantially parallel to each other. Third sheet-metal section 31 is connected to first sheet-metal section 20 with the aid of sixth sheet-metal section 11. The first and sixth sheet-metal sections (20, 11) and the third and sixth sheet-metal sections (31, 11) are, e.g., disposed at a right angle to each other in each case.

Seventh sheet-metal section 14 is situated on second sheet-metal section 23 and substantially extends parallel to sixth sheet-metal section 11. The sixth and seventh sheet-metal sections (11, 14) restrict the bending angle between the first and second sheet-metal sections (20, 23), and in particular restrict it in a second bending direction that extends counter to the first bending direction.

The sixth and seventh sheet-metal sections (11, 14) are situated at a distance from bending section 30. Sixth sheet-metal section 11, e.g., has a projection, which is arranged such that seventh bending section 14 touches the projection and, in particular, is restricted by the projection when a maximum second bending angle is reached in the second bending direction. The maximum second bending angle is less than 90°, e.g., less than 45°, less than 20°, less than 10°, etc.

Second sheet-metal section 23 has an interface for the mechanical connection to electrical apparatus 1. The interface may be arranged in the form of two guide sections (40, 52), especially slots, in second sheet-metal section 23. With their aid, sheet-metal part 32 is connectable to electrical apparatus 1, in particular connectable by plugs. Electrical apparatus 1 includes two screw devices for this purpose, via which holding device 3 is guided with the aid of the guide sections (40, 52). The screw devices make it possible to connect holding device 3 to electrical apparatus 1 by force locking and in a detachable manner.

First cable clip 9 has a cable-clip section 21, in particular a small foot that is able to be introduced into a recess 44 in first sheet-metal section 20. Cable-clip section 21 guides cable clip 9 in first sheet-metal section 20. First cable clip 9 may have two or even four cable-clip sections 21 that are guided in a respective recess (44, 46, 50) in first sheet-metal section 20. Cable-clip sections 21 are disposed on both sides of cable 8 transversely to the extension direction of cable 8.

First cable clip 9 and first sheet-metal section 20 each include a bore hole 45 for the feed-through of a screw device 22. With the aid of screw device 22, first cable clip 9 is connected to first sheet-metal section 20 by force locking.

Cable 8 is resting on first sheet-metal section 20, and the cable shield being connected to first sheet-metal section 20 in an electrically conductive manner. Cable 8 is disposed between first sheet-metal section 20 and first cable clip 9. As a result, cable 8 is connected to holding device 3 in a force-locked manner.

If cable 8 is provided with an insulation that surrounds the cable shield, then cable 8 will be stripped in the contact region of first sheet-metal section 20 and cable 8 so that the cable shield is connected to first sheet-metal section 20 in an electrically conductive manner. For example, the separation point of cable 8 is disposed between first cable clip 9 and first sheet-metal section 20.

Cable 8 and/or the inner conductors of cable 8 are not subjected to traction on account of holding device 3.

A second cable may also be connected to first sheet-metal section 20 and first cable clip 9 by force locking. For this purpose the second cable is situated between first sheet-metal section 20 and cable clip 9 and regionally extends substantially parallel to cable 8. Cable 8 and the second cable are therefore arranged in the form of a bundle with the aid of the holding device.

A further cable 13, e.g., two further cables that have identical cable cross-sections, is/are placed on third sheet-metal section 31. The cable cross-section of further cable 13 is smaller than the cable cross-section of cable 8. A cable shield of further cable 13 is connected to third sheet-metal section 31 in an electrically conductive manner. Further cable 13 is situated between third sheet-metal section 31 and second cable clip 10. This connects further cable 13 to the holding device in a force-locked manner.

Third sheet-metal section 31 has at least one recess for guiding a cable-clip section of the second cable clip, in particular the small foot. A respective bore hole for the feed-through of a screw device 12 is provided in second cable clip 10 and in third sheet-metal section 31 in each case. Screw device 12 connects second cable clip 10 to third sheet-metal section 31 in a detachable and force-locked manner.

Further cable 13, e.g., functions as a signal cable, for instance for a sensor connected to the motor, such as a temperature sensor, transducer, or current sensor.

Figure 6:
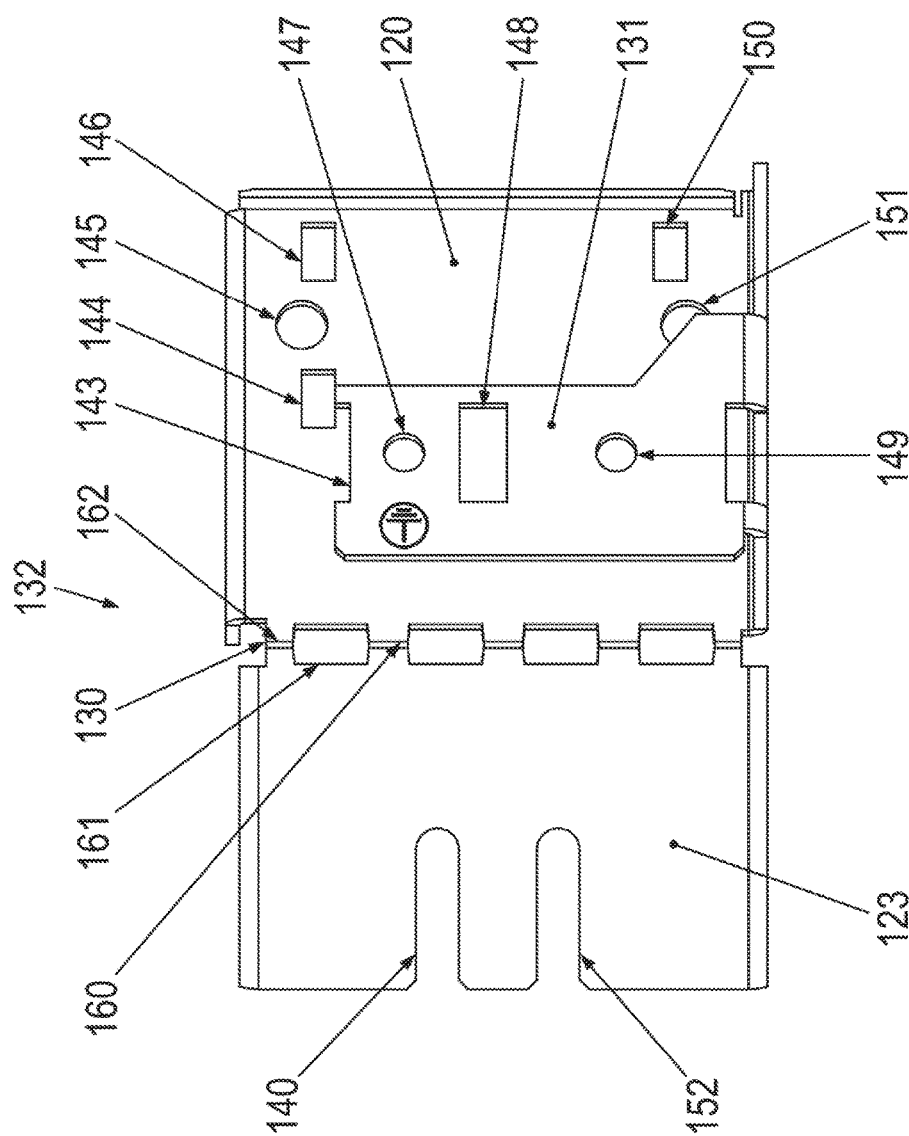
FIG. 6 shows a plan view of a sheet-metal part of a holding device according to an example embodiment of the present invention.
Figure 7:
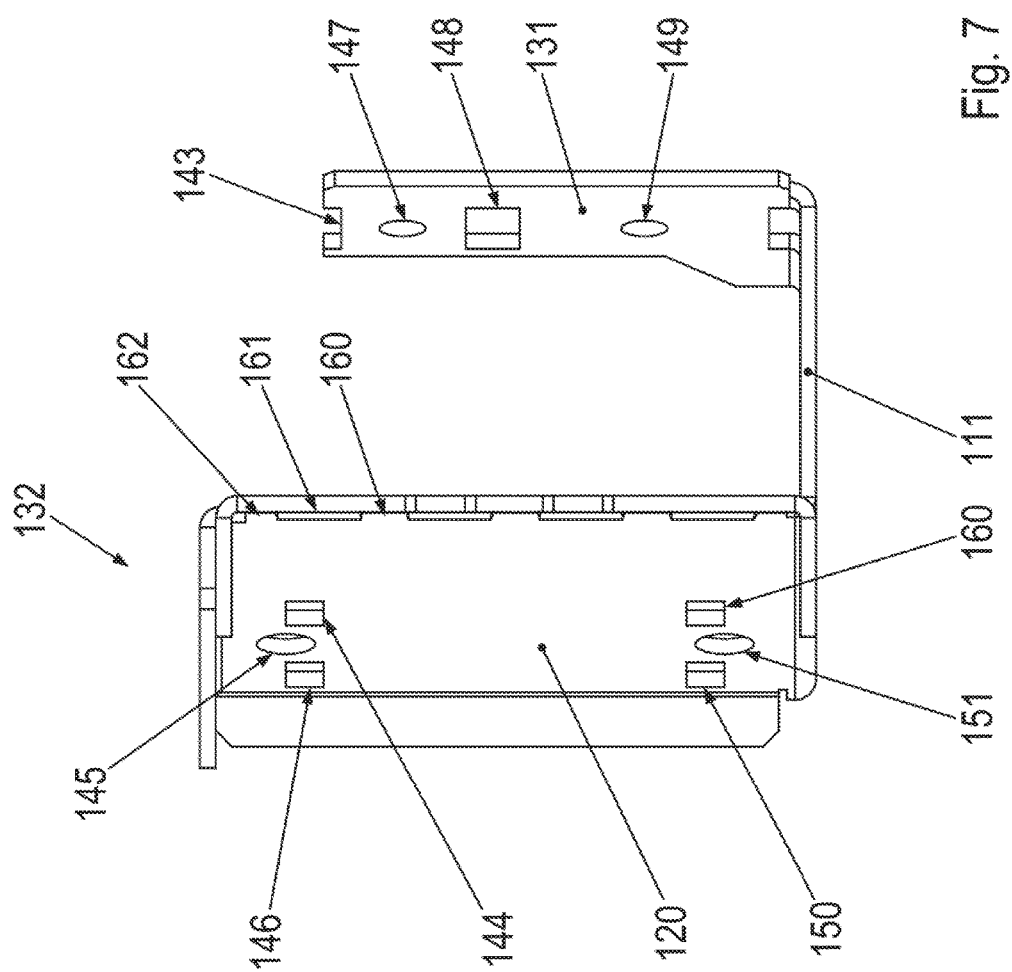
FIG. 7 shows an oblique view of the sheet-metal part illustrated in FIG. 6.

A sheet-metal part 132 according to an example embodiment of the present invention is illustrated in FIGS. 6 and 7.

The sheet-metal part 132 corresponds to the sheet-metal part 32. For this reason, only the features that differ are further described. The other features correspond to the features of sheet-metal part 32.

In the sheet-metal part 132, bending section 130 is formed by at least two web sections (160, 162) that are set apart from each other. A separate recess 161 is disposed between the web sections (160, 162).

Bending section 130 extends in the form of a line, e.g., in a direction transverse to the extension direction of cable 8.

In the extension direction of bending section 130, recess 161 extends farther than the web sections (160, 162), in particular more than twice as far.

The web sections (160, 162) may have a concave form and recess 161 may have a concave form. Bending section 130 extends through the narrowest point of the web sections (160, 162). The respective narrowest points of the web sections (160, 162) may lie on a line, so that bending section 130 is provided in linear form.

The sheet-metal part (32, 132) may have a lower sheet thickness in the bending section (30, 130) than in all other sheet-metal sections. The sheet thickness in the bending section amounts to, e.g., 50% to 90% of the maximum sheet thickness of the sheet-metal part (32, 132), e.g., to 60% to 80%, to 70% to 80%, etc.

LIST OF REFERENCE NUMERALS 1 electrical apparatus
2 housing part
3 holding device
4 fourth sheet-metal section
5 connection means, in particular connection cable
6 recess
7 fifth sheet-metal section
8 cable, in particular motor-connection cable
9 first cable clip
10 second cable clip
11 sixth sheet-metal section
12 screw device
13 cable, in particular signal cable
14 seventh sheet-metal section 15 first plug-connector part
16 second plug-connector part
20 first sheet-metal section
21 cable-clip section
22 screw device
23 second sheet-metal section
30 bending section
31 third sheet-metal section
32 sheet-metal part
40 guide section
41 tapered region
42 tapered region
43 guide section
44 recess
45 bore hole
46 recess
47 bore hole
48 recess
49 bore hole
50 recess
51 bore hole
52 guide section
53 web section
54 web section
60 recess
103 holding device
120 sheet-metal section
123 sheet-metal section
130 bending section
131 sheet-metal section
32 sheet-metal part
140 guide section
143 guide section
144 recess
145 bore hole
146 recess
147 bore hole
148 recess
149 bore hole
150 recess
151 bore hole
152 guide section
160 web section
161 recess
162 web section

The invention claimed is:

1. A holding device for a cable, comprising:
a sheet-metal part having a first sheet-metal section, a second sheet-metal, and a bending section connecting the first sheet-metal section and the second sheet metal section;
wherein the first sheet-metal section is bendable and/or manually bendable relative to the second sheet-metal section such that the first sheet-metal section and the second sheet-metal section are arranged at a non-vanishing bending angle relative to each other, the first sheet-metal section connected in an electrically conductive manner to a cable shield of the cable, the cable connected to the first sheet-metal section by force-locking and/or being held, guided, and/or locally guided with the aid of the holding device; and
wherein the second sheet-metal section includes an interface for a mechanical connection;
wherein the bending section has a lower sheet thickness than all other sheet-metal sections and includes at least two web sections set apart from each other by a recess arranged between the web sections.

2. The holding device according to claim 1, wherein the bending section is linear.

3. The holding device according to claim 1, wherein the cable is routable and/or at least partially routable through the recess.

4. The holding device according to claim 3, wherein the cable, a further conductor of the cable, and/or an inner conductor of the cable is connected to a plug-connector part, the plug-connector part routable through the recess, the cable shield terminating at the first sheet-metal section.

5. The holding device according to claim 1, wherein the web sections are concave, the recess is convex, and the web sections are linear.

6. The holding device according to claim 1, further comprising a cable clip, the cable connected to the holding device by force-locking with the aid of the cable clip, the cable being arranged between the sheet-metal part and the cable clip, the cable being kept non-tensioned with the aid of the sheet-metal part and the cable clip, a cable shield of the cable being connected to the cable clip in an electrically conductive manner, the cable having a cable insulation that is stripped between the cable clip and the sheet-metal part.

7. The holding device according to claim 6, wherein the cable clip includes a cable-clip section and a recess for a screw device, the sheet-metal part including a recess for feed-through of the cable-clip section and a bore hole for the screw device, the cable clip guided in the recess with the aid of the cable-clip section, the cable clip being connected to the sheet-metal part in a detachable manner with the aid of the screw device.

8. The holding device according to claim 6, wherein a second cable is connected to the holding device with the aid of the cable clip, the cable being bundled with the aid of the holding device, the cable and the second cable having an identical cable cross-section.

9. The holding device according to claim 1, wherein the sheet-metal part includes a third sheet-metal section that extends parallel to the first sheet-metal section, and a further cable is connected with the aid of a further cable clip to the third sheet-metal section, a conductor and/or a cable shield of the further cable being connected in an electrically conductive manner to the further cable clip and the third sheet-metal section, the further cable having a smaller or a larger cable cross-section than the cable.

10. The holding device according to claim 1, wherein the sheet-metal part includes a fourth sheet-metal section and a fifth sheet-metal section, the fourth sheet-metal section being arranged at a non-vanishing angle and/or at a right angle to the second sheet-metal section, the fifth sheet-metal section being arranged at a non-vanishing angle and/or at a right angle to the first sheet-metal section, the bending section being arranged between the fourth sheet metal section and the fifth sheet-metal section, the bending angle between the first sheet-metal section and the second sheet-metal section being restricted with the aid of the fourth sheet-metal section and with the aid of the fifth sheet-metal section, the fourth sheet-metal section touching the fifth sheet-metal section at a maximum bending angle.

11. The holding device according to claim 1, wherein the first sheet-metal section and the second sheet-metal section are connected to each other in an electrically conductive manner with the aid of a connection cable, and/or the sheet-metal part is arranged as one piece, as a punched part, and/or as a bent part.

12. An electrical apparatus, comprising:

a holding device for a cable according to claim 1; and at least one housing part, the holding device connected to the housing part in a detachable manner, the housing part connected in an electrically conductive manner to a cable shield of the cable with the aid of the holding device, the housing part being connected to ground.

13. The electrical apparatus according to claim 12, wherein the second sheet-metal section includes two guide sections connecting the holding device to the housing part as an interface for the mechanical connection, the holding device plug-connected to the housing part with the aid of the guide sections, the holding device being connected to the housing part in a detachable manner with the aid of a screw device.

14. The electrical apparatus according to claim 12, wherein the cable is connected to the electrical apparatus in a detachable manner with the aid of a plug-connector part, the electrical apparatus including a mating plug-connector part, a further conductor and/or an inner conductor of the cable being connected in an electrically conductive manner to the mating plug-connector part with the aid of the plug-connector part.

\* \* \* \* \*